(12) United States Patent
Everhart

(10) Patent No.: US 7,272,857 B1
(45) Date of Patent: Sep. 18, 2007

(54) METHOD/SYSTEM FOR PREVENTING IDENTITY THEFT OR MISUSE BY RESTRICTING ACCESS

(75) Inventor: Glenn C. Everhart, Smyrna, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 893 days.

(21) Appl. No.: 10/126,920

(22) Filed: Apr. 19, 2002

Related U.S. Application Data

(60) Provisional application No. 60/284,940, filed on Apr. 20, 2001.

(51) Int. Cl.
| | |
|---|---|
| G06F 7/04 | (2006.01) |
| G06F 17/30 | (2006.01) |
| G06K 9/00 | (2006.01) |
| H03M 1/68 | (2006.01) |
| H04K 1/00 | (2006.01) |
| H04L 9/00 | (2006.01) |
| H04L 9/32 | (2006.01) |
| H04N 7/16 | (2006.01) |

(52) U.S. Cl. ............... 726/26; 705/1; 705/50; 705/51; 726/22

(58) Field of Classification Search ........... 707/101; 726/26
See application file for complete search history.

(56) References Cited

U.S. PATENT DOCUMENTS

| | | | |
|---|---|---|---|
| 3,938,091 A | 2/1976 | Atalla et al. | |
| 4,321,672 A | 3/1982 | Braun et al. | |
| 4,567,359 A | 1/1986 | Lockwood | |
| 4,633,397 A | 12/1986 | Macco | |
| 4,695,880 A | 9/1987 | Johnson | |
| 4,696,491 A | 9/1987 | Stenger | |
| 4,713,761 A | 12/1987 | Sharpe | |
| 4,725,719 A | 2/1988 | Oncken et al. | |
| 4,823,264 A | 4/1989 | Deming | |
| 4,882,675 A | 11/1989 | Nichtberger | |
| 4,964,043 A | 10/1990 | Galvin | |
| 4,992,940 A | 2/1991 | Dworkin | |
| 5,016,270 A | 5/1991 | Katz | |
| 5,050,207 A | 9/1991 | Hitchcock | |
| 5,084,816 A | 1/1992 | Boese | |
| 5,157,717 A | 10/1992 | Hitchcock | |
| 5,220,501 A | 6/1993 | Lawlor | |
| 5,265,033 A | 11/1993 | Vajk | |
| 5,317,683 A | 5/1994 | Hager | |
| 5,321,841 A | 6/1994 | East | |
| 5,351,186 A | 9/1994 | Bullock | |
| 5,412,708 A | 5/1995 | Katz | |

(Continued)

OTHER PUBLICATIONS eCharge, eCharge Corporation, www.echarge.com, Dec. 3, 1999.

(Continued)

*Primary Examiner*—Emmanuel L. Moise
*Assistant Examiner*—Nadia Khoshnoodi
(74) *Attorney, Agent, or Firm*—Hunton & Williams LLP

(57) ABSTRACT

A system and method for network file filtering. The file filtering process includes scanning at least one data file for density of a selected pattern. The process may also include restricting access to the file if the density of the selected pattern in the data file is greater than or equal to a threshold density.

5 Claims, 4 Drawing Sheets

U.S. PATENT DOCUMENTS

| | | |
|---|---|---|
| 5,418,951 A | 5/1995 | Damashek |
| 5,420,405 A | 5/1995 | Chasek |
| 5,424,938 A | 6/1995 | Wagner |
| 5,446,740 A | 8/1995 | Yien |
| 5,450,537 A | 9/1995 | Hirai |
| 5,467,269 A | 11/1995 | Flaten |
| 5,473,143 A | 12/1995 | Vak |
| 5,473,732 A | 12/1995 | Change |
| 5,479,530 A * | 12/1995 | Nair et al. .................. 382/119 |
| 5,485,370 A | 1/1996 | Moss et al. |
| 5,511,117 A | 4/1996 | Zazzera |
| 5,532,920 A | 7/1996 | Hartrick |
| 5,537,314 A | 7/1996 | Kanter |
| 5,537,437 A | 7/1996 | Kaku |
| 5,544,086 A | 8/1996 | Davis |
| 5,557,518 A | 9/1996 | Rosen |
| 5,568,489 A | 10/1996 | Yien |
| 5,570,465 A | 10/1996 | Tsakanikas |
| 5,590,197 A | 12/1996 | Chen |
| 5,592,560 A | 1/1997 | Deaton |
| 5,594,837 A | 1/1997 | Noyes |
| 5,598,557 A | 1/1997 | Doner |
| 5,606,496 A | 2/1997 | D'Agostino |
| 5,621,789 A | 4/1997 | McCalmont |
| 5,621,812 A | 4/1997 | Deaton |
| 5,625,767 A | 4/1997 | Bartell |
| 5,634,101 A | 5/1997 | Blau |
| 5,638,457 A | 6/1997 | Deaton |
| 5,644,493 A | 7/1997 | Motai |
| 5,652,786 A | 7/1997 | Rogers |
| 5,653,914 A | 8/1997 | Holmes et al. |
| 5,657,383 A | 8/1997 | Gerber |
| 5,659,165 A | 8/1997 | Jennings |
| 5,664,115 A | 9/1997 | Fraser |
| 5,675,662 A | 10/1997 | Deaton |
| 5,684,870 A | 11/1997 | Maloney |
| 5,710,887 A | 1/1998 | Chelliah |
| 5,710,889 A | 1/1998 | Clark |
| 5,727,163 A | 3/1998 | Bezos |
| 5,734,838 A | 3/1998 | Robinson |
| 5,740,231 A | 4/1998 | Cohn |
| 5,754,840 A | 5/1998 | Rivette |
| 5,758,328 A | 5/1998 | Giovannoli |
| 5,761,647 A | 6/1998 | Boushy |
| 5,761,661 A | 6/1998 | Coussens |
| 5,774,122 A | 6/1998 | Kojima |
| 5,778,178 A | 7/1998 | Arunachalam |
| 5,784,562 A | 7/1998 | Diener |
| 5,790,650 A | 8/1998 | Dunn |
| 5,790,785 A | 8/1998 | Klug |
| 5,793,861 A | 8/1998 | Haigh |
| 5,794,221 A | 8/1998 | Egendorf |
| 5,794,259 A | 8/1998 | Kikinis |
| 5,796,395 A | 8/1998 | De Hond |
| 5,802,498 A | 9/1998 | Comesanas |
| 5,802,502 A | 9/1998 | Gell |
| 5,815,657 A | 9/1998 | Williams |
| 5,815,683 A | 9/1998 | Vogler |
| 5,819,092 A | 10/1998 | Ferguson |
| 5,819,285 A | 10/1998 | Damico |
| 5,826,241 A | 10/1998 | Stein |
| 5,826,245 A | 10/1998 | Sandberg-Diment |
| 5,826,250 A | 10/1998 | Trefler |
| 5,832,182 A | 11/1998 | Zhang et al. |
| 5,832,476 A | 11/1998 | Tada |
| 5,835,580 A | 11/1998 | Fraser |
| 5,838,906 A | 11/1998 | Doyle |
| 5,842,178 A | 11/1998 | Giovannoli |
| 5,842,211 A | 11/1998 | Horadan |
| 5,842,217 A | 11/1998 | Light |
| 5,844,553 A | 12/1998 | Hao |
| 5,845,259 A | 12/1998 | West |
| 5,845,260 A | 12/1998 | Nakano |
| 5,847,709 A | 12/1998 | Card |
| 5,848,427 A | 12/1998 | Hyodo |
| 5,862,223 A | 1/1999 | Walker |
| 5,870,456 A | 2/1999 | Rogers |
| 5,870,724 A | 2/1999 | Lawlor |
| 5,873,072 A | 2/1999 | Kight |
| 5,884,032 A | 3/1999 | Bateman |
| 5,884,288 A | 3/1999 | Chang |
| 5,884,305 A | 3/1999 | Kleinberg et al. |
| 5,889,863 A | 3/1999 | Weber |
| 5,892,900 A | 4/1999 | Ginter |
| 5,898,780 A | 4/1999 | Liu |
| 5,903,881 A | 5/1999 | Schrader |
| 5,914,472 A | 6/1999 | Foladare |
| 5,915,244 A | 6/1999 | Jack |
| 5,918,214 A | 6/1999 | Perkowski |
| 5,918,217 A | 6/1999 | Maggioncalda |
| 5,918,239 A | 6/1999 | Allen |
| 5,926,812 A | 7/1999 | Hilsenrath |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole |
| 5,940,812 A | 8/1999 | Tengel |
| 5,952,641 A | 9/1999 | Korshun |
| 5,953,710 A | 9/1999 | Fleming |
| 5,958,007 A | 9/1999 | Lee |
| 5,960,411 A | 9/1999 | Hartman |
| 5,963,952 A | 10/1999 | Smith |
| 5,963,953 A | 10/1999 | Cram |
| 5,969,318 A | 10/1999 | Mackenthun |
| 5,970,482 A | 10/1999 | Pham |
| 5,982,370 A | 11/1999 | Kamper |
| 5,991,751 A | 11/1999 | Rivette |
| 5,991,780 A | 11/1999 | Rivette |
| 5,995,948 A | 11/1999 | Whitford |
| 5,999,907 A | 12/1999 | Donner |
| 6,005,939 A | 12/1999 | Fortenberry |
| 6,012,088 A | 1/2000 | Li |
| 6,014,636 A | 1/2000 | Reeder |
| 6,014,638 A | 1/2000 | Burge |
| 6,018,714 A | 1/2000 | Risen |
| 6,026,398 A * | 2/2000 | Brown et al. .................. 707/5 |
| 6,026,429 A | 2/2000 | Jones |
| 6,032,147 A | 2/2000 | Williams |
| 6,049,835 A | 4/2000 | Gagnon |
| 6,055,637 A | 4/2000 | Hudson |
| 6,061,665 A | 5/2000 | Bahreman |
| 6,064,987 A | 5/2000 | Walker |
| 6,081,810 A | 6/2000 | Rosenzweig |
| 6,088,683 A | 7/2000 | Jalili |
| 6,088,700 A | 7/2000 | Larsen |
| 6,098,070 A | 8/2000 | Maxwell |
| 6,112,181 A | 8/2000 | Shear |
| 6,131,810 A | 10/2000 | Weiss |
| 6,134,549 A | 10/2000 | Regnier |
| 6,138,129 A | 10/2000 | Combs |
| 6,144,948 A | 11/2000 | Walker |
| 6,148,293 A | 11/2000 | King |
| 6,170,011 B1 | 1/2001 | Macleod Beck |
| 6,185,242 B1 | 2/2001 | Arthur |
| 6,189,029 B1 | 2/2001 | Fuerst |
| 6,195,644 B1 | 2/2001 | Bowie |
| 6,201,948 B1 | 3/2001 | Cook |
| 6,202,158 B1 * | 3/2001 | Urano et al. .................. 726/22 |
| 6,332,141 B2 | 12/2001 | Gonzalez et al. |
| 6,363,381 B1 * | 3/2002 | Lee et al. ...................... 707/6 |
| 6,374,251 B1 | 4/2002 | Fayyad et al. |
| 6,377,942 B1 | 4/2002 | Hinsley et al. |
| 6,438,666 B2 * | 8/2002 | Cassagnol et al. .......... 711/163 |
| 6,738,779 B1 * | 5/2004 | Shapira ...................... 707/101 |

| | | | |
|---|---|---|---|
| 6,785,810 B1 * | 8/2004 | Lirov et al. | 713/165 |
| 2001/0054003 A1 | 12/2001 | Chien | |
| 2002/0010599 A1 | 1/2002 | Levison | |
| 2003/0009426 A1 * | 1/2003 | Ruiz-Sanchez | 705/78 |
| 2005/0131721 A1 * | 6/2005 | Doctorow et al. | 705/1 |

OTHER PUBLICATIONS

Tracy Pletz et al., Summary of the at your risk architecture, Jun. 3, 1999.
Siebel, Siebel: Ensuring Customer Success, www.siebel.com, Nov. 17, 1999.
OMG, Welcome to OMG's CORBA for Beginners Page!, www.omg.com, May 25, 1999.
Sun MicroSystems, Inc., Schema for Representing CORBA Objects in a LDAP directory, May 21, 1999.
OMG, Library, www.omg.com, May 25, 1999.
OMG, What is CORBA?, , www.omg.com, May 25, 1999.
Overview of CORBA, , www.omg.com, May 25 1999.
JAVA, JAVA™ Technology in the Real World, java.sun.com, May 21, 1999.
JAVA, JAVA™ Servlet API, java.sun.com, May 21, 1999.
JAVA, Staying in Touch with JNDI, java.sun.com, May 21, 1999.
JAVA, JAVA™ Remote Method Invocation (RMI) interface, java.sun.com, May 21, 1999.
JAVA, Banking on JAVA™ Technology, java.sun.com, May 21, 1999.
JAVA, The JDBC™ Data Access API, java.sun.com, May 21, 1999.
Anne Thomas, Enterprise JAVABEANS™ Technology: Server Component Model for the Java™ platform, java.sun.com, May 21, 1999.
S. R. Hiremath, Numerical Credit Scoring Model, Operations Research Bulletin, WA13.16, Apr. 30, 1975.
Reuters, Getting Smart with Java: Sun Micro Says American Express to Use Java for Smart Card, www.abcnew.go.com/sciences/tech, Jun. 6, 2000.
David Bank, Cash, Check, Charge—What's Next?, Seattle Times, Mar. 6, 1998.
Gerry Vandenengel, Cardson the Internet: Advertising on a $3 Bill, Industry Intelligence, Feb. 1, 1995.
Kim A. Strassel, Dutch Software Concern Experiments with Electronic 'Cash' in Cyberspace, Wall Street Journal, Apr. 17, 1995.
Jeffrey Kutler, Cash Card Creator Looking Beyond Mondex, Feb. 9, 1995.
David Post, E-Cash: Can't Live With It, Can't Live Without It, The American Lawyer, pp. 116-117, Mar. 1, 1996.
Russell Mitchell, Cyberspace: Crafting Software . . . , Business Week, pp. 78-86, Feb. 27, 1995.
Jeffrey Kutler, A Different Drummer on the Data Highway, American Banker, May 12, 1995.
Stephen Eppmt, A pLayer Goes After Big Bucks in Cyberspace, American Banker, May 5, 1995.
Robert Barnham, Networks Brings Together Producers and Companies, Bests Review Feb. 1, 1994.
Vanessa Houlder, OFT Gives the Individual Top Priority: Report Calls for Deregulation of Business Lending, The Financial Times, Jun. 8, 1994.
Kennedy Maiz, Fannie Mae on the Web, Newsbyte, May 8, 1995.
Anne Knowles, Improved Internet Security Enabling On-Line Commerce, PC Week, Mar. 20, 1995.
Aversion Therapy: Banks Overcoming Fear of the Net to Develop Safe Internet-based Payment System w/ Netscape Communicator, Network World, Dec. 12, 1994.
Don Clark, Microsoft, Visa to Jointly Develop PC Electronic-Shopping Software, Wall Street Journal, The, B9, Nov. 9, 1994.
Understanding Product Data Management, Hewlett-Packard Company, Apr. 26, 1999.
Getting Started: Specific GE TPN Post Service Use Guideline, GE, Apr. 26, 1999.
Resource Center: Consolidated Edison Selects GE TPN Post, GE, Apr. 26, 1999.
ThomasNet, Thomas Publishing Company, Apr. 26, 1999.
SoluSource: For Engineers By Engineers, Thomas Publishing Company, Apr. 26, 1999.
Harris InfoSource, Apr. 26, 1999.
Welcome to MUSE, MUSE Technologies, Apr. 26, 1999.
Product Data Integration Technologies, Inc., PDIT, Apr. 26, 1999.
SBA: Pro-Net, SBA, Apr. 1, 1999.
FreeMarkets, FreeMarkets Online, Inc., Apr. 26, 1999.
Associates National Bank (DE) Credit Card Services, The Associates, www.theassocitheassociates.atescomcorn/consumer/credit_cards/main.html, Apr. 6, 1999.
At Your Request, Wingspanbankcom, Sep. 28, 1999.
Robyn Meredith, Internet bank moves closer to virtual reality, USA Today, May 5, 1995.
Marvin Sirbu and J.D. Tygar, NetBill: An Internet Commerce System Optimized for Network Delivered Services, http://www.ini.cmu.edu :80/netbill, pp. 1-12, Feb. 27, 1995.
The check is in the email., Information Today, vol. 12, No. 3, Mar. 1, 1995, ISSN: 8755-6286.
The Gale Group, G&D America's Multi-application Smart Card Seleted for Combined Payroll and 'Virtual Banking' Program in Mexico, wysiwyg://0/http://www.dialogclassic.com/history, Business Wire, Apr. 24, 1998, p4241047.
Richard Mitchell, Netlink Goes After An Unbanked Niche, wysiwyg://0/http://www.dialogclassic.com/history, ISSN: 1093-1279, Sep. 1999.
Documentation regarding GNU grep, www-aix.gsi.de/gnu/grep-20, Jul. 19, 2002.

* cited by examiner

METHOD/SYSTEM FOR PREVENTING IDENTITY THEFT OR MISUSE BY RESTRICTING ACCESS

CROSS REFERENCE TO RELATED APPLICATION

The subject matter of this application is related to the subject matter of provisional application U.S. Ser. No. 60/284,940, filed Apr. 20, 2001, assigned or under obligation of assignment to the same entity as this application, from which application priority is claimed, and which application is incorporated by reference.

FIELD OF THE INVENTION

The invention relates to the field of data security. More particularly, the invention relates to detecting and protecting data in computer files.

BACKGROUND OF THE INVENTION

Many businesses receive correspondence, such as from customers or vendors, which may contain sensitive data, such as confidential financial information. This correspondence may be stored in computer data files. For example, the stored correspondence may include emails that are stored in email archives or other storage. The stored correspondence may also include documents scanned into a computer system and stored as text or other data files.

The stored correspondence files may be accessible by a large number of people in a data-driven company, such as a bank. Since it is not always known which stored correspondence files contain sensitive information, when they were received or archived, or where they are currently stored, it is difficult to protect the correspondence files that contain sensitive information. The stored correspondence files or other files containing sensitive information may occupy a large amount of space in a computer system. It is time consuming to go through each correspondence file to determine if sensitive information is contained in the file. Other problems exist.

BRIEF SUMMARY OF THE INVENTION

It is therefore desirable to address the drawbacks in conventional network file filtering systems.

The invention overcoming these and other problems in the art relates to a system and method for network file filtering, which include scanning at least one data file for the density of a selected pattern. The invention may restrict access to the file if the density of the selected pattern in the text file is greater than or equal to a predetermined key word density threshold.

DETAILED DESCRIPTION OF THE INVENTION

The invention is described in relation to a network file filtering system and method. Nonetheless, the characteristics and parameters pertaining to the system and method may be applicable to other types of file filtering systems and other data or file identification or search systems. Like elements are referred to using like numerals for clarity throughout the drawings and description.

Figure 1:
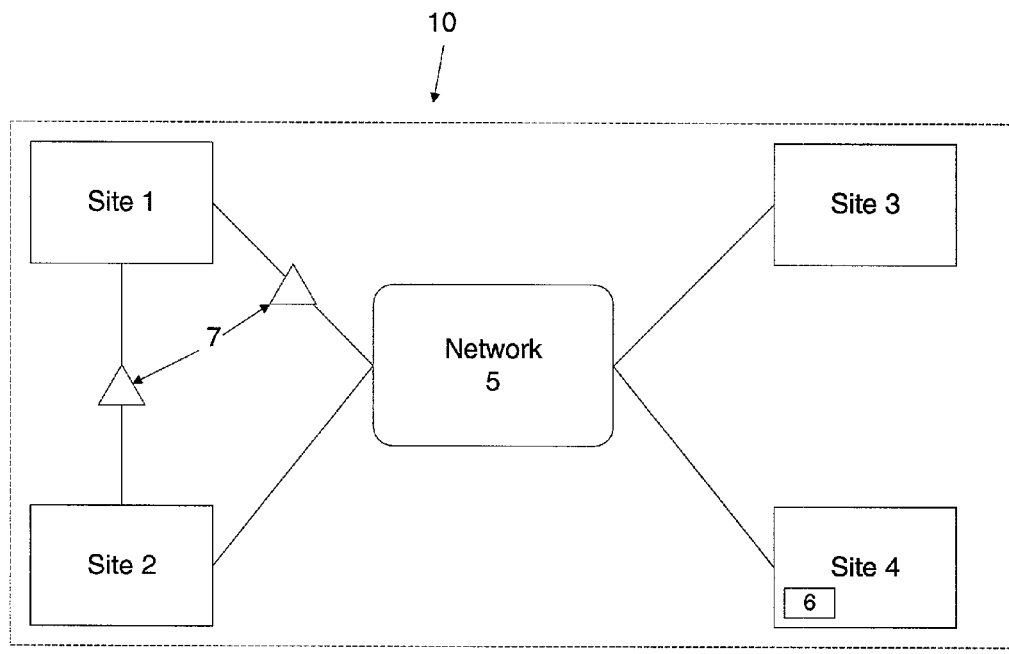
FIG. 1 is a block diagram illustrating one embodiment of a system suitable for implementing the network file filtering system and method according to the invention.

FIG. 1 is a block diagram illustrating one embodiment of a system 10 implementing the file filtering system and method according to the invention. The system 10 includes network nodes or sites 1-4, a network 5 and a file filtering system 6. In one embodiment, a file filtering system may reside on one of the sites 1-4. In the embodiment illustrated, file filtering system 6 resides at site 4. In one embodiment, file filtering system 6 may reside on a plurality of sites 1-4 or at all sites 1-4 of the system 10.

Although only four sites or nodes 1-4 are shown, any number of sites 1-4 may exist in system 10. In one embodiment, system 10 may include only one site 1-4. In another embodiment, system 10 may include as many sites as necessary or desired by a user.

In one embodiment, system 10 may include a server for managing network-related traffic. In one embodiment, each of sites 1-4 may include a network server. The server may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Each of sites 1-4 may communicate to each other and to network 5 through communications link 7. Communications link 7 may be a part of network 5 in one embodiment. Communications link 7 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection.

Communications link 7 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 7 may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

Sites 1-4 may communicate with each other and to network 5 using network enabled code. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Figure 2:
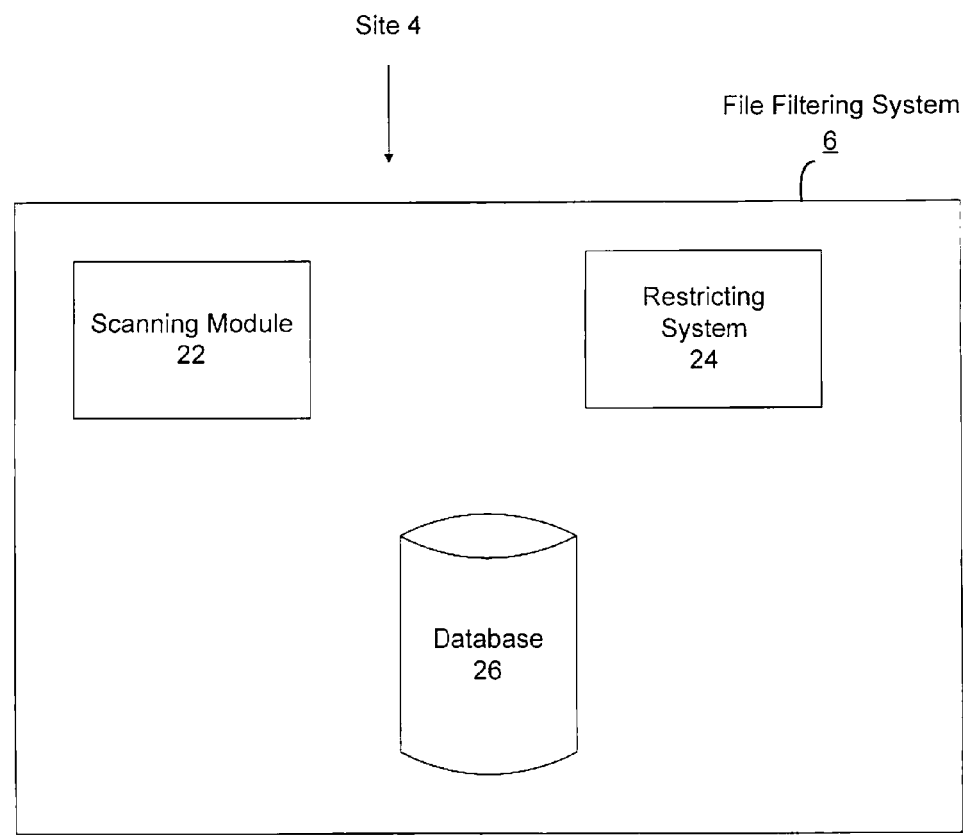
FIG. 2 is a block diagram of one embodiment of a file filtering system according to the invention.

FIG. 2 is a block diagram illustrating one embodiment of a file filtering system according to the invention. File filtering system 6 of FIG. 1 may include a scanning module 22, a restricting system 24 and a database 26. In one embodiment, scanning module 22 may be used to scan files stored at sites 1-4 of a system 10 for confidential financial information such as credit card numbers. Restricting system 24 may be used to restrict the files found to have confidential financial information from access by unauthorized user or uses.

Database 26 may be used to store data regarding scanning criteria, restricting criteria, scanning and restricting algorithms, identification of files that need to be restricted and any other data associated with filtering files having sensitive information in a system 10. The database 26 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

Figure 3:
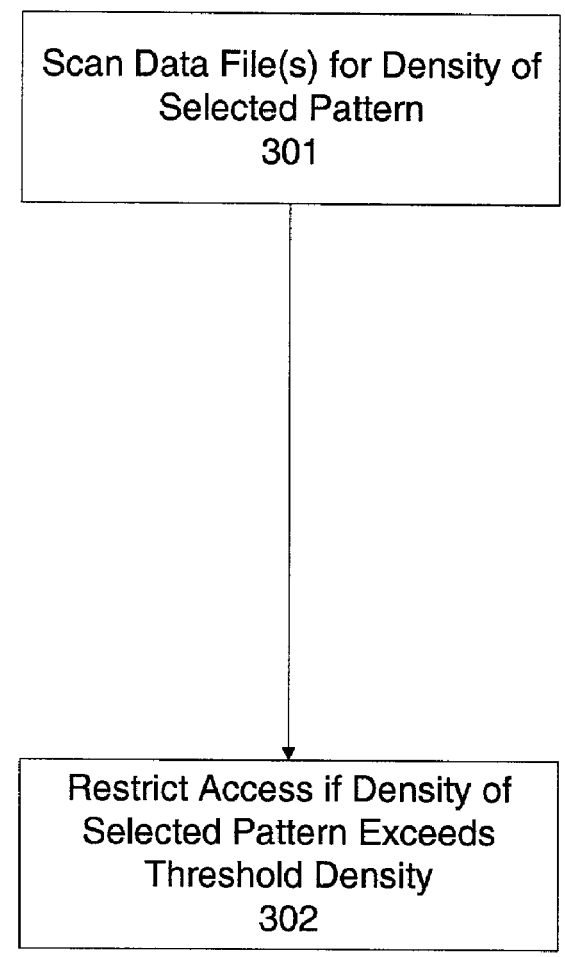
FIG. 3 is a flow diagram illustrating one method of filtering files according to the invention.

FIG. 3 is a flow diagram illustrating one embodiment of a method for filtering files in a system 10. At step 301, the scanning module 22 may scan data files in system 10 for density of a key word. At step 302, the restricting system 24 may restrict access to each file having a key word density greater than or equal to a threshold density.

As will be described in more detail below, the various processes illustrated in FIG. 3 may be performed by a system, such as the system illustrated in FIGS. 1 and 2. The steps illustrated in FIG. 3 will now be described in greater detail.

At step 301, the scanning module 22 may scan at least one data file and the system 10 for density of a selected pattern. In one embodiment, scanning the data files for the density of a selected pattern may include scanning the data file for occurrences of the selected pattern and determining the density of the selected pattern in the data file. In one embodiment, the density of the selected pattern may be determined by dividing the number of occurrences of the selected pattern by the size of the data file which may be given in any format known today or later developed.

In one embodiment, scanning the data file for the selected pattern density may also include comparing the density of the selected pattern in the file to a threshold density. In one embodiment, the threshold density may be a predetermined threshold density. In another embodiment, the threshold density may be a selectable threshold density. The threshold density may be selected by a systems administrator or other user. The threshold density may be selected based on the type of data being scanned. The types of data being scanned may include ASCII (American Standard Code for Information Interchange) text, streaming audio, graphics, etc.

In one embodiment, the threshold density may be selected based on the length of the file. For example, the longer the file is, the lower the threshold density. In one embodiment, the threshold density may be a variable threshold density that varies with the size of the file scanned.

In one embodiment, the threshold density may be determined after analyzing the selected pattern density in at least one data file. The threshold density may be based on predetermined formulas or trial and error methods.

In one embodiment, the selected pattern may include a key word string. In one embodiment, the key word string may be a key word string of a predetermined length including at least one predetermined substring. For example, the key word string may be a numeric string having a length equal to the length of a standard credit card number. In one embodiment, the predetermined substring may be a substring associated with a specific credit card issue. For example, the substring may be the first four digits of a credit card number identifying a specific bank issuing the credit card if the filtering is being done by a bank or other financial service company.

The selected pattern may be any pattern that works in an industry. Thus, the pattern may be determined by finding patterns that tend preferentially to be present in proprietary data in the business area of the data being filtered. For example, if the filtering is being performed by a chemical company, a chemical name or process technical term may be used for the selected pattern. In another embodiment, the selected pattern may include a non-text pattern. For example, the selected pattern may be a symbol or other graphic representation.

In one embodiment, the selected pattern may include a plurality of selected patterns. For example, the selected patterns may include social security number, date of birth, and credit card number. The threshold density of the selected patterns may be an aggregate threshold density. For example, the density of the set of selected patterns may calculated by determining the individual density of each selected pattern. The individual densities of the selected patterns that are predetermined to be 'less useful' may be subjected to a range constraint so that if the individual density of the less useful pattern is below the range, the individual density will be set to the minimum density of the range. All of the individual densities may be multiplied together to produce a product density. The product density may then be compared to the aggregate threshold density. The aggregate threshold density may be determined empirically.

By combining several selected patterns or discriminators that are particularly usable, in the manner described above, a discriminator may be obtained that performs much better than any of the individual selected patterns. A well chosen combination of selected patterns may result in filtering that produces a very low alarm rate (rate of filtering files that do not need filtering). For example, in a financial services company, a combination of addresses and credit card numbers may produce an alarm rate of less than 10%. Protecting the extra 10% of files would be negligible overhead compared to the time and cost investment of examining each data file for sensitive data.

In one embodiment, the selected threshold density may be predetermined based on the type of data for which the scan is performed. In another embodiment, the selected threshold density may be selected after scanning at least one data file to determine what the selected pattern should be. The selected threshold density may be selected by a user or selected by performing an electronically performed algorithm to select the selected pattern.

At step 302, the restricting system 24 may restrict access to each file where the selected pattern density is greater than or equal to the threshold density. In one embodiment, restricting access to the file may include activating a security system for each file having a selected pattern density greater than or equal to a threshold density. In one embodiment, the file having a selected pattern density greater than a threshold density may be assigned an identifier or label to identify the file as a sensitive file. The identifier or label may alert system 10 to activate restricting system 24 when access of the sensitive file is attempted. In one embodiment, the identifier may be stored in database 26.

In one embodiment, the restricting system may perform an algorithm to restrict access to all files having a sensitive file identifier stored in database 26.

In one embodiment, activating the security system may include scanning the database 26 or all of the files in system 10 to identify data files having an identifier stored in database 26 or having an associated sensitive file identifier.

In one embodiment, the security system may include restricting access to a sensitive file by password protecting the file. In one embodiment, restricting access to a file may include controlling access to the file based on the time of day when a file is being accessed. In one embodiment, access to a sensitive file may be restricted based on the time of day a specific user is trying to access the file.

In one embodiment, access to the file may be restricted based on the user trying to access the file. In one embodiment, only certain users or a certain subset of users may have access to the file. For example, for a first set of restricted files, only clerical staff may have access to the files in the first set. For a second set of restricted files, only management may have access to the files of the second set.

In one embodiment, the place of access by the user may be restricted. For example, a user may only be able to access the file from the user's own desktop terminal. In one embodiment, the user may only be able to access the file from a certain central terminal.

In one embodiment, the type of file authorization assigned to the user may be used to restrict access to the file. For example, a user may be authorized to view certain types of files such as financial information, etc. In one embodiment, a person assigned a highly sensitive file authorization may not be able to view a low sensitivity file. In another embodiment, a user having authorization to view low sensitivity files may not have authorization to view files having a higher sensitivity. Thus, there may be a minimum or maximum security authorization, or both, assigned to the file to restrict access.

In one embodiment, the type of privileges authorization assigned to the user may be used to restrict access to a file. In one embodiment, the types of privileges authorization may include privilege to view a file, privilege to copy a file, privilege to back up a file, or privilege to edit a file. In one embodiment, controlling access based on the types of privileges authorized may include a privilege ceiling where a user with a greater amount of privilege than the privilege ceiling may be restricted from accessing the sensitive file. Thus, a user with the privilege of copying or editing files may not have access to a restricted file having a privilege ceiling of viewing the file, whereas a user having a privilege of viewing files would have access to the file.

In one embodiment, controlling access based on the types of privileges authorized may include a privilege floor where a user with a lesser amount of privilege than the privilege floor is restricted from accessing the file. In this embodiment, a user having a privilege of only viewing a file may not have access to a restricted file having a privilege floor of editing the file.

In one embodiment, restricting access to a sensitive file may include hiding the file from an unauthorized access. In one embodiment, hiding the file may include redirecting an unauthorized user to another file in any location of the system 10 when the unauthorized user tries to access the sensitive file.

In one embodiment, restricting access to the file may also include activating an alarm to indicate when an unauthorized access is occurring. In one embodiment, the restricting system 24 may execute site specific commands to gather evidence of what actions an unauthorized user is performing when the unauthorized user is trying to access the sensitive file. The restricting system 24 may execute the site specific commands to gather evidence without exposing the file to the unauthorized user.

In one embodiment, restricting access to the file may include granting identifiers to a file opening process for the file at the time the file is opened and then revoking the identifiers when the file is closed. In one embodiment, the restricting system 24 may prevent a covert code from running in association with the sensitive file. In one embodiment, preventing the covert code from running may include attaching a crypt checksum to the file. In one embodiment, preventing the covert code from running may include attaching a privilege mask to the file.

In one embodiment, full network awareness may be implemented so that an extended access control is very powerful. Cross-network checks for access control may be performed. In one embodiment, distributed firewall checks of access rates may be performed for access control and alarms, providing statistical quality control. Checks can be done of the access frequency of users to files. For example, a clerk who normally must access a customer file to answer phone queries might access a few hundred customer records per day. By watching access frequencies, a clerk accessing thousands of customer records per day might be flagged, since he might be doing this access for unauthorized purposes. Checks of network operations may be used to control files as they are created or inherited from a directory protection profile.

A database management system may be used as a lookup agent. The "change dir" command may be overloaded so that some preselected patterns might imply looking for files flagged with some security labels when seen, instead of selecting file names only, which could allow selection of more attributes including security attributes. This may speed up finding of content. In one embodiment, search engine techniques may be used to populate the database management system. In one embodiment, the database management system may also return "not-yet-classified" files in directory lists. The system may allow full soft linking and full conditioned soft links, not just on access fail. These access control methods, are published in the program Safety, published on the DECUS VMS SIG tapes in 1996. Softlinks are also known to Unix users as "symbolic links".

Figure 4:
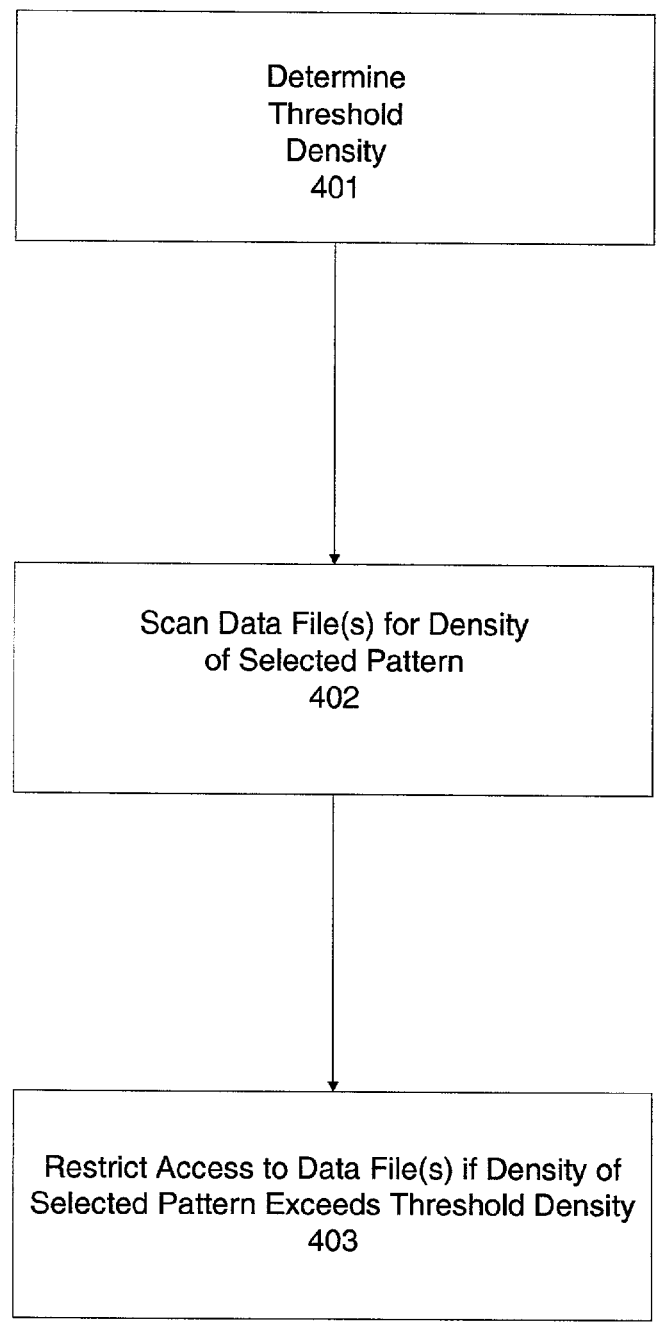
FIG. 4 is a flow diagram illustrating another embodiment of a method for filtering files according to the invention.

FIG. 4 depicts a flow diagram illustrating another embodiment of a method for filtering files according to the invention. At step 401, the density threshold of a selected pattern is determined by, for example, a processor capable of making a density threshold determination. This determination may be made by, for example, analyzing a data file or by performing an algorithm on one or more data files. At 402, a scanning module scans data files in system 10 and determines the density of a selected pattern. This determination may be made as described previously with relation to FIG. 3. At step 403, the restricting system 24 may restrict access to each file having a selected pattern density greater than or equal to the threshold density. This access restriction may comprise password protection of the data file, time of day, user type, place of access, file authorization, or privileges authorization.

As was described in relation to FIG. 3, the various processes illustrated in FIG. 4 may be performed by a system, such as the system illustrated in FIGS. 1 and 2.

A system and method for filtering files is described where the files may stay at the location in which they are stored. Thus, there is no need to add large databases or use additional memory in existing databases to store the files found to include sensitive data. A method for filtering files is described where each file does not have to be read by an individual to determine whether the file contains sensitive data. Thus, the speed of file filtering is greatly increased by using a program to scan documents for selected pattern strings.

While the foregoing description includes many details and specificities, it is to be understood that these have been included for purposes of explanation only, and are not to be interpreted as limitations of the invention. Many modifications to the embodiments described above can be made without departing from the spirit and scope of the invention, as is intended to be encompassed by the following claims and their legal equivalents.

What is claimed is:

1. A method of preventing identity theft and other wrongful use of information stored in a computer system of an enterprise engaged in recording financial and other confidential information, said method comprising the steps of:
    (a) providing said computer system including a database having non-image files, said non-image files comprising non-sensitive and sensitive data files, wherein the sensitive data files include sensitive information including customer names, addresses, zip codes, contact information, dates of birth, social security numbers, and financial account numbers of one or more of bank accounts, credit card accounts, and debit card accounts, and wherein there are multiple users authorized by the enterprise to access the system;
    (b) selecting a special pattern to identify sensitive data files based upon at least one of:
        (i) a first keyword string, including an alphanumeric string structured for identifying at least a portion of the numeric data identifying a financial account comprising one or more of bank accounts, credit card accounts, and debit card accounts;
        (ii) a second string structured for identifying one or more of customer names, addresses, zip codes, contact information, dates of birth, and social security numbers;
    (c) measuring the average density of said special patterns in said database in said computer system;
    (d) multiplying the densities of the special patterns in the database file to produce a product density:
    (e) identifying special files on said database having product densities greater than a selected threshold product density, the product densities being determined as a result of non-spectral scanning of said database:
    (f) protecting the special files by moving them to a secure location hidden from all users other than specially authorized users;
    (g) restricting access to prevent identity theft and other wrongful use of information stored in said special files when the density of the selected pattern in the data file is greater than or equal to the density threshold by at least one of:
        (i) activating an alarm to indicate when unauthorized access to the special file is occurring or has occurred;
        (ii) password protecting the data file;
        (iii) controlling access based on one or more of user type, place of user access, user file authorization, and user privileges authorization;
        (iv) executing site specific commands wherein the site specific commands gather evidence of what actions an unauthorized user is undertaking or undertook without exposing the data file to the unauthorized user;
        (v) granting at least one identifier to a file opening process for the data file and revoking the identifier when the data file is closed;
        (vi) preventing covert code from running in association with the data file by attaching at least one of a crypt checksum and a privilege mask to the data file.

2. A computer system for recording financial and other confidential information wherein multiple users are authorized to access the system, said system comprising:
    (a) a database having non-image files, said non-image files including non-sensitive and sensitive data files, wherein the sensitive data files include sensitive information including customer names, addresses, zip codes, contact information, dates of birth, social security numbers, and financial account numbers of one or more of bank accounts, credit card accounts, and debit card accounts;
    (b) a first processor for selecting a special pattern to identify sensitive data files based upon at least one of:
        (i) a first keyword string, including an alphanumeric string structured for identifying at least a portion of the numeric data identifying a financial account comprising one or more of bank accounts, credit card accounts, and debit card accounts;
        (ii) a second string structured for identifying one or more of customer names, addresses, zip codes, contact information, dates of birth, and social security numbers;
    (c) the processor configured to measure the average density of said special patterns in said database;
    (d) the first processor configured to multiply the densities of the special patterns in the database to produce a product density;
    (e) the first processor configured to determine whether product densities are greater than or equal to a selected threshold product density, the product densities being determined as a result of non-spectral scanning of said database;
    (f) a second processor for protecting the special files by moving them to a secure location hidden from all users other than specially authorized users;
    (g) the second processor configured to restrict access to prevent identity theft and other wrongful use of information stored in said special sensitive data files when the density of the selected pattern in the data file is greater than or equal to the density threshold by one or more of the second processor:
        (i) activating an alarm to indicate when unauthorized access to the data file is occurring or has occurred;
        (ii) password protecting the data file;
        (iii) controlling access based on one or more of user type, place of user access, user file authorization, user privileges authorization;

(iv) executing site specific commands wherein the site specific commands which gather evidence of what actions an unauthorized user is undertaking or undertook without exposing the data file to the unauthorized user;
(v) granting at least one identifier to a file opening process for the data file and revoking the identifier when the data file is closed;
(vi) preventing covert code from running in association with the data file by attaching at least one of a crypt checksum and a privilege mask to the data file.

3. The computer system of claim 2, wherein the first processor and the second processor are separate processors.

4. The computer system of claim 2, wherein the first processor and the second processor are the processor.

5. The computer system of claim 2, wherein the operations corresponding to the first processor and the second processor are performed by a plurality of processors numbering three or more processors.

* * * * *